US007503540B2

(12) United States Patent
Hood

(10) Patent No.: US 7,503,540 B2
(45) Date of Patent: Mar. 17, 2009

(54) DETACHABLE SUCTION-BASED HOLDER

(75) Inventor: Robert K. Hood, Fort Mohave, AZ (US)

(73) Assignee: Too Kool Recreation, Fort Mohave, AZ (US)

( * ) Notice: Subject to any disclaimer, the term of this patent is extended or adjusted under 35 U.S.C. 154(b) by 0 days.

(21) Appl. No.: 11/798,394

(22) Filed: May 14, 2007

(65) Prior Publication Data

US 2007/0210235 A1 Sep. 13, 2007

Related U.S. Application Data

(63) Continuation-in-part of application No. 10/688,696, filed on Oct. 20, 2003, now Pat. No. 7,229,059.

(60) Provisional application No. 60/801,974, filed on May 18, 2006.

(51) Int. Cl.
*A01K 97/10* (2006.01)

(52) U.S. Cl. .................... 248/537; 248/205.8; 248/363

(58) Field of Classification Search ................ 248/537, 248/205.5, 205.6, 205.7, 205.8, 205.9, 206.1, 248/206.2, 363

See application file for complete search history.

(56) References Cited

U.S. PATENT DOCUMENTS 3,020,017 A * 2/1962 Watson .................... 248/205.8
4,580,751 A * 4/1986 Panzer .................... 248/205.8
6,142,432 A * 11/2000 Amussen ................ 248/205.5
6,550,735 B1 * 4/2003 Zheng ........................ 248/304
2002/0166926 A1 * 11/2002 Black ........................ 248/105
2002/0185575 A1 * 12/2002 Kalb ...................... 248/205.5
2007/0120026 A1 * 5/2007 Chen ...................... 248/205.5
2007/0200037 A1 * 8/2007 Nan ....................... 248/205.5

* cited by examiner

*Primary Examiner*—Ramon O Ramirez
(74) *Attorney, Agent, or Firm*—Maier & Maier, PLLC

(57) ABSTRACT

A detachable suction-based holder in accordance with at least one embodiment of the present invention is disclosed. Such a suction-based holder can include a lever-actuated suction portion having a substantially cup-like suction housing and a substantially circular suction interface. The suction interface can be made from an elastomeric material and further can have an inner face and an outer face. The suction holder can also include a substantially tubular receptacle portion having a substantially tubular receiving channel defined therein. The receptacle portion can have a hold actuator as an appendage from the top portion thereof where the hold actuator can be substantially tab-like and can be split. Moreover, the hold-actuating lever can be coupled to the hold actuator via, for example, a pin. Moreover, a connector member such as a bridging member can connect the suction portion and the receptacle portion.

13 Claims, 8 Drawing Sheets

40
38
36
32
26
22
14
20
16
28
30
34
18
24

DETACHABLE SUCTION-BASED HOLDER

CROSS REFERENCE TO RELATED APPLICATIONS

This application is a continuation-in-part of U.S. application Ser. No. 10/688,696, filed Oct. 20, 2003 now U.S. Pat. No. 7,229,059, the disclosure of which is incorporated by reference herein in its entirety. This application also claims priority under 35 U.S.C. 119(e) to U.S. Provisional Application Ser. No. 60/801,974, filed May 18, 2006, the disclosure of which is incorporated by reference herein in its entirety.

FIELD

The invention generally relates to suction-based mounts and more particularly to detachable suction-based holders for, inter alia, holding, clamping, mounting and supporting various items such as items having a pole-type member.

BACKGROUND

Generally, bases that are often relatively weighted and bulky are conventionally used as holding devices: that provide shade (e.g., a beach or pool umbrella); that are used in various sport and gaming activities (e.g., basketball hoop or volleyball nets); and that are used for various recreational as well as industrial applications. As implied above, often conventional bases are used to hold items having a pole-type member. For example, shade systems having umbrella or umbrella-type components are designed to provide shade, which decreases sun (e.g. UV) exposure and assists in preventing cancers linked to sun exposure.

Additionally various mounts and holders are intended for long-term attachment without the option of being detachable with relatively little effort or damage to the surface they are placed upon. Like the conventional bases above, various mounts and holders have often been used to secure items in and around pool areas, patio areas, recreational areas and industrial areas as a few examples. Various types of mounts and holders have been used for displaying items such as flags and banners, which often have pole-type members.

Conventional suction cups have been used for various attachment purposes and are generally available. Conventional suction cups are often detachable with relatively little effort or surface damage and in general are ideally suited for smooth or semi-smooth surfaces as a substantial seal must be maintained to provide suction-based (vacuum-based) attachment. Suction cup technology continues to grow in sophistication, application and capacity of suction.

The following patent publications illustrate and describe various background apparatuses, devices, systems and methods. U.S. Pat. No. 6,216,629 (Straub) teaches a system of stanchions used to warn about the depth of a swimming pool. The stanchions stand upright and carry a "no dive" warning message about the depth of the pool. U.S. Pat. No. 5,996,951 (O'Burill, et al.) teaches a device designed to cooperate with the hanging hooks of a drying rack that includes a levered suction cup whose body, in the shape of a circular dome, has an extension parallel to one diameter and a plane end face substantially perpendicular to the surface against which the suction cup is applied. U.S. Pat. No. 5,813,641 (Baldwin) teaches a removable clamp bracket for supporting an object from an elongated channel member which has spaced grooves formed in one surface thereof such as may typically be used in screened lanai and swimming pool cage enclosures. U.S. Pat. No. 4,903,926 (McNarry, et al.) teaches a detachable immersible support for supporting articles in a swimming pool comprising a mooring bracket, a U-shaped frame member, an article support and a frame member space. U.S. Pat. No. 4,844,395 (Perentin) teaches a suction-cup with a flexible pipe, with two guides, parallel if required, fitted on the suction-cup itself.

SUMMARY

An embodiment of the present invention discloses a suction-based holder and a method of making and using the same where the suction holder can include a suction portion having a suction housing and a suction interface. The suction interface can have an inner face and an outer face where portions of the inner face of the suction interface can be associated with the housing. The suction holder can also include a receptacle portion having a receiving channel defined therein. Moreover, a connector portion can connect the suction portion and the receptacle portion.

Yet another embodiment of the present invention discloses a suction-based holder that can have a suction means for providing detachably vacuum-based attachment to a surface, a receiving and holding means for receiving and lever-controlled holding of pole-type work pieces, and a connecting means for bridging the suction means and the receiving and holding means.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
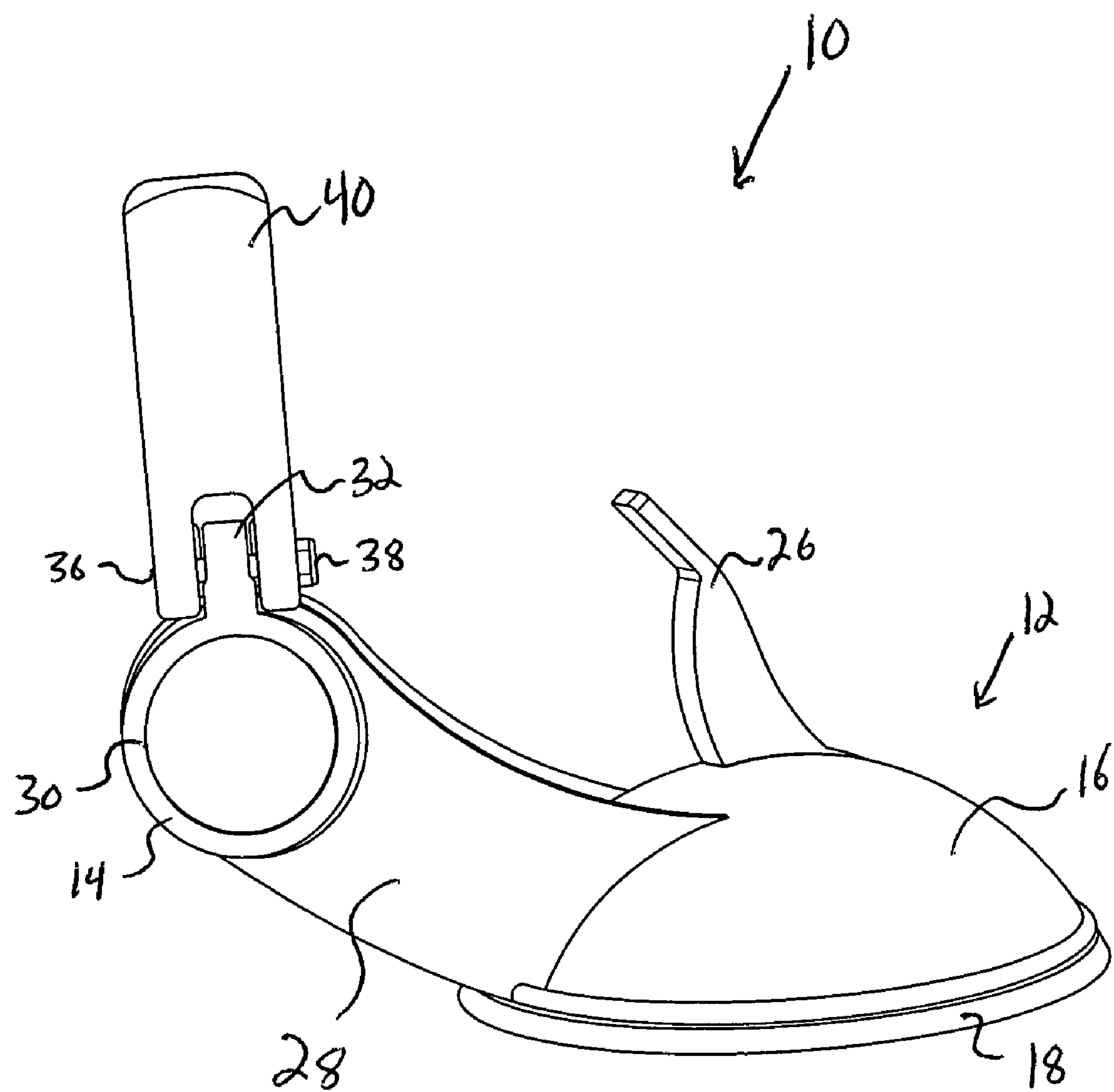
FIG. 1 is a side view of one exemplary embodiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Embodiments of the present invention can be used with various items whether the items are conventionally used as athletic equipment, recreational items, display items, industrial equipment and the like as long as a portion of such items and equipment is capable of being held. For example, portions or members that are pole-type in form may be held by exemplary embodiments. As one non-limiting example, embodiments can be used with recreational and industrial shade systems (e.g. provided by umbrella or umbrella-like structures). Moreover, recreational items for use with embodiments may include recreational items commonly found in and around patio and pool areas.

Further, embodiments can be detachable, movable and carried relatively easily by a person of ordinary physical ability. Thus, such embodiment can be used with shade systems to increase the ability to detach, move and carry such systems. This can be beneficial in that detachable and transportable shade systems in accordance with at least one embodiment can assist in preventing cancers linked to (promoted or caused by) sun exposure by shielding such exposure through the use of detachable and transportable shade systems. As another non-limiting example, since at least one embodiment can be used under-water on suitable surfaces (also can be used around water on suitable surfaces), embodiments can be used to hold various physical therapy devices and equipment, particularly, for water-related physical therapy.

Referring now to the figures, FIGS. 1-8 depict a holder (or exploded view thereof) with a suction-based surface-detachable portion according to at least one exemplary embodiment of the present invention. Holder 10 may be ideally suited for applying and attaching to substantially flat and smooth or semi-smooth surfaces, although is not so limited. Additionally, holder 10 is envisioned to be used out-of-water, partially underwater and underwater on surfaces located in the same. Holder 10 can primarily include a suction portion 12 and a receptacle portion 14.

Those portions and any subportions, components, members, connectors, actuators and the like can be integral or modular and any combination thereof that would be appreciated by one having ordinary skill in the art. Unless explicitly stated otherwise, all such portions, components, members, connectors, actuators and the like can be made from various materials known to one having ordinary skill in the art such as metals, alloys, rubbers, plastics, glasses, ceramics and the like. Also, all such portions, components, members, connectors, actuators and the like can be formed integrally or modularly (or a combination thereof) using known injection molding processes. For example, unless otherwise stated, all portions, components, members, connectors, actuators and like can be made of glass-filled polypropylene using multi-material injection molding processes.

As shown, for example, in FIG. 1, suction portion 12 can include a suction housing (e.g., cup portion) 16, which can be a subportion that is cup-like in form. Suction housing 16 can also have suction interface 18 associated with, for example, the periphery of suction housing 16 so that the periphery of suction housing 16 is associated substantially near or approaching the outer edge of suction interface 18 so as to define a cavity between the two. Also, suction interface 18 can be a plate or pad as a couple non-limiting examples, which can be in a substantially circular shape (excluding any projection(s) such as tab 34 as shown, e.g., in FIG. 2) that substantially corresponds to the periphery of cup-like suction housing 16 so as to facilitate association between the two. Suction interface 18 can be made of any suitable rubber or elastomeric material known to one having ordinary skill in the art. For example, in at least one exemplary embodiment, suction interface 18 can be made of a thermoplastic elastomer.

If substantially circular, suction interface 18 can have a diameter between 3-7 inches (e.g., about 5 inches) and a thickness between 0.125 and 0.5 inches (e.g., about a quarter inch), which is known to be suitable for certain recreational applications (e.g., for various items found around pools and patios) such as for conventional pool umbrellas, pool volleyball nets and other like items, but embodiments are not so limited.

Figure 2:
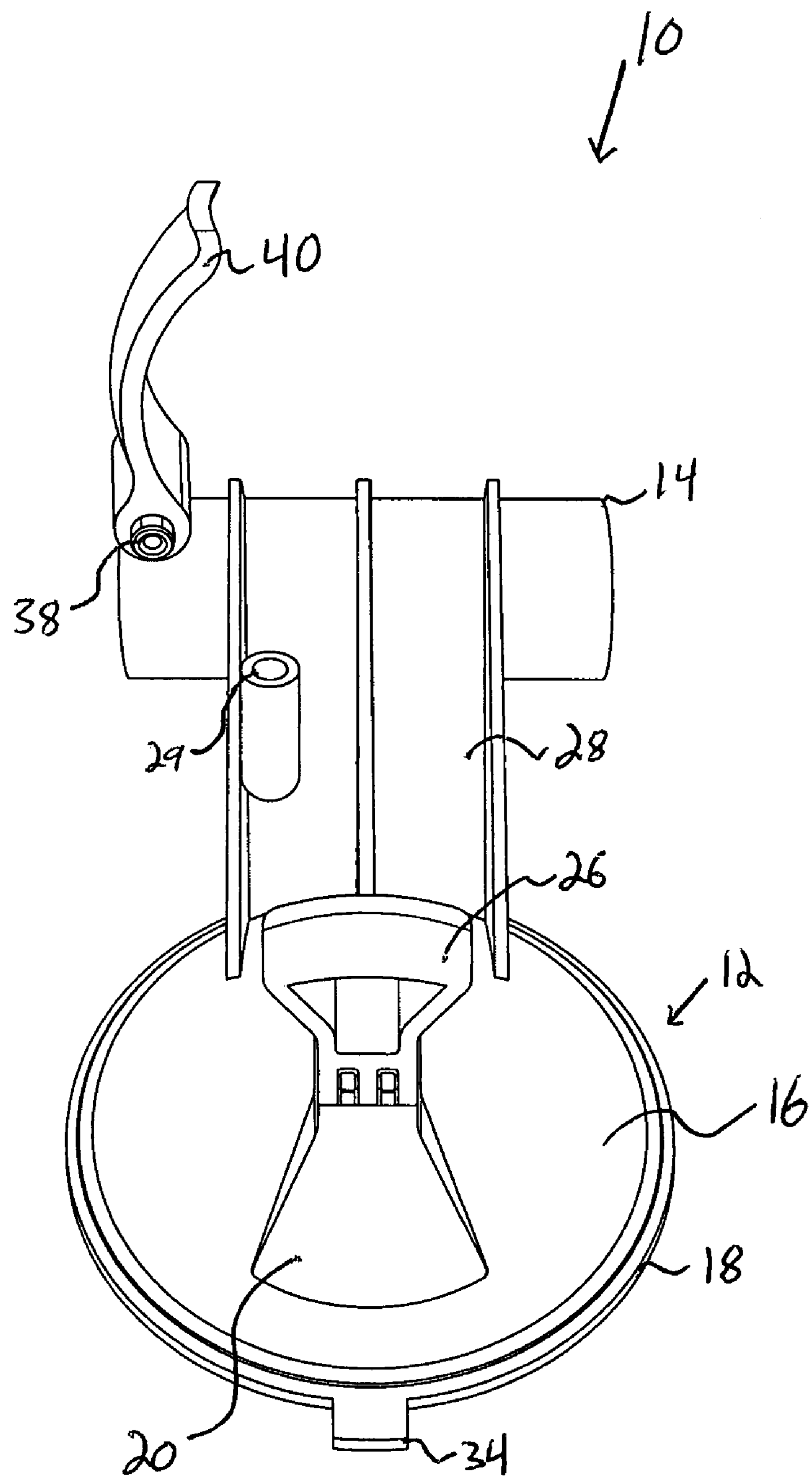
FIG. 2 is a front perspective view of one exemplary embodiment.
Figure 3:
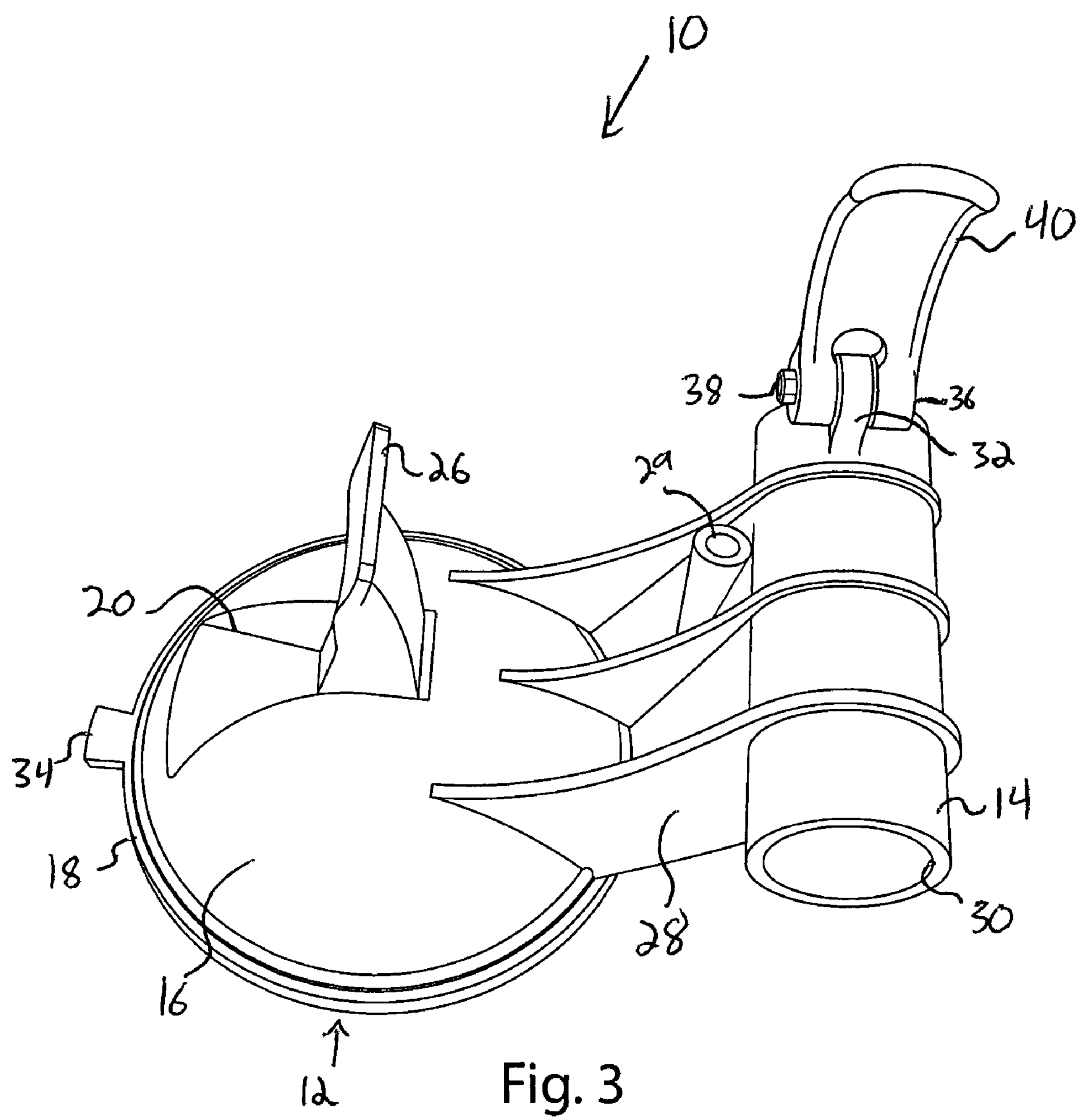
FIG. 3 is a side perspective view of one exemplary embodiment.
Figure 4:
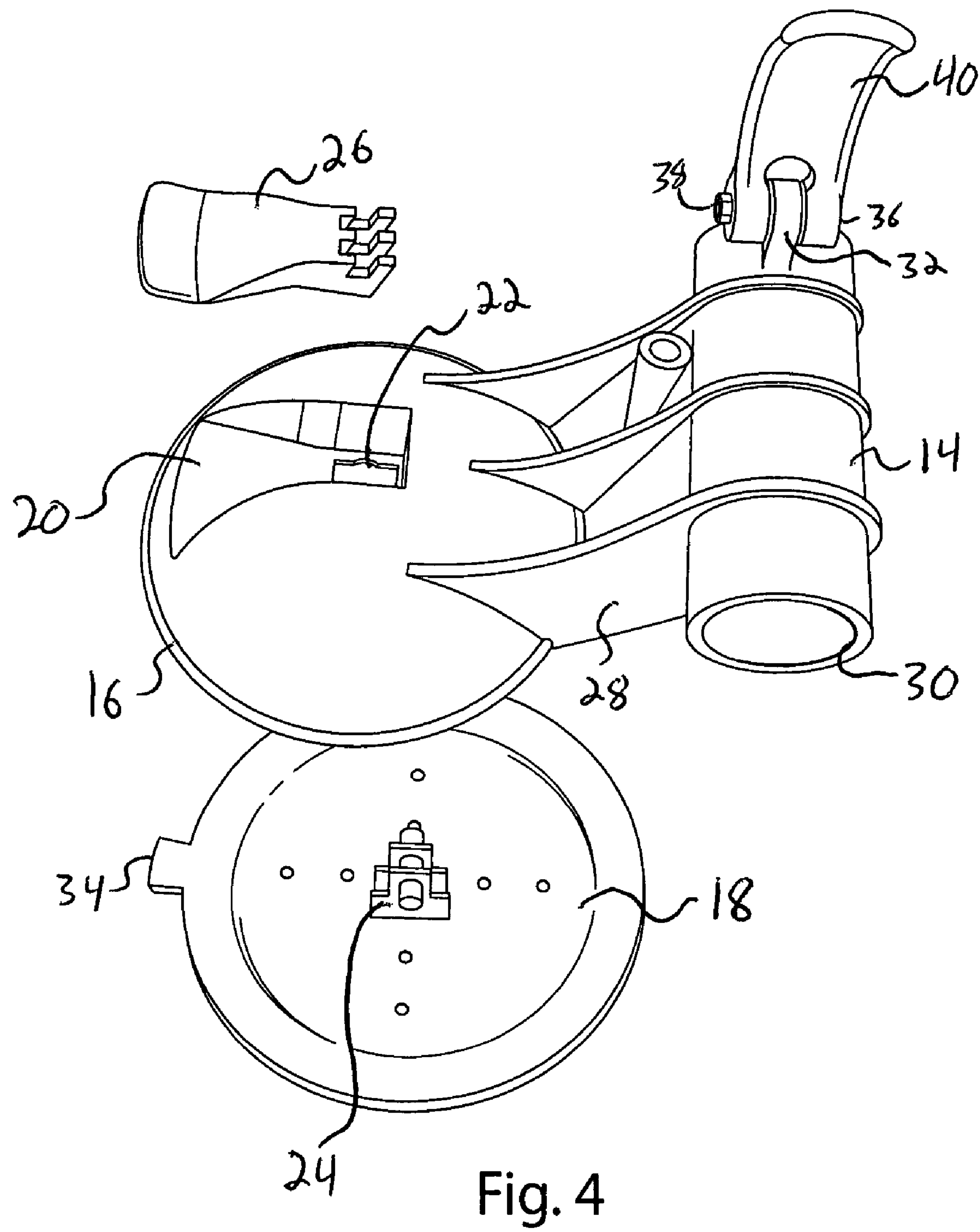
FIG. 4 is an exploded view of one exemplary embodiment.
Figure 5:
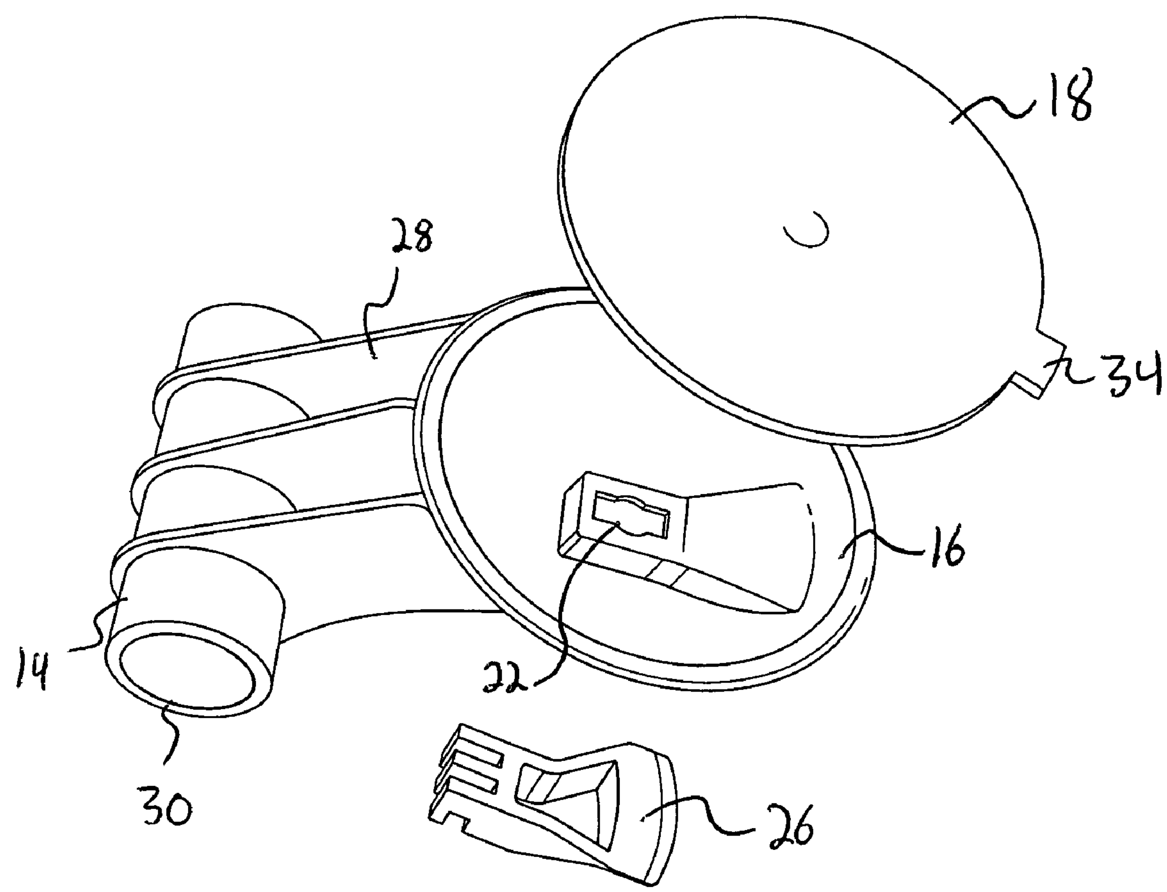
FIG. 5 is another exploded view of one exemplary embodiment.

As best shown in the perspective views of FIG. 2 and FIG. 3 as well as the exploded views of FIGS. 4 and 5, suction housing 16 can include basin-like subportion 20 that can also have aperture 22 (see FIGS. 4 and 5) defined on the floor thereof for receiving and positioning suction actuator 24 (see FIG. 4). Suction actuator 24 can be received through the bottom of aperture 22 and can sit within basin-like subportion 20.

Basin-like subportion 20 can assist in providing suction actuation by imparting at least partially unimpeded range of motion to a suction-actuating device such as suction-actuating lever 26 within the negative space of basin-like subportion 20 when, for example, suction-actuating lever 26 is operatively coupled with, for instance, suction actuator 24. Suction actuator 24 itself, can be connected to suction interface 18, for example, on the inner face (i.e. surface that does not interface with an attachment surface) thereof so as to assume a position that allows coupling to suction-actuating lever 26. Although suction housing 16 and suction interface 18 can be associated with adhesive materials as one example, they can, alternatively (or additionally), be associated by the coupling of suction actuating lever 26 to suction actuator 24 where such coupling can impart force to contacting portion(s) of suction interface 18 so that suction interface 18 can be contacted (e.g., substantially tightly thereto) to the periphery of suction housing 16 when, for example, suction-actuating lever 26 is in the suction-engaging state (lever-depressed).

Although not shown, a stopper may be situated on top portion of suction housing 16 for retaining the range of motion of suction-actuating lever 26 by providing a stop to the backside of suction-actuating lever 26 when it is being forced to move beyond a certain suction-disengaging range.

As shown in FIGS. 1-8, holder 10 can include a connector portion 28, which can be a bridging member between suction portion 12 and receptacle portion 14. As stated in general before, bridging portion 28 can be integral or modular. Bridging portion 28 can include sidewalls as well as top and bottom surfaces. One or more apertures, channels or slots such as channel 29 and the like can be defined within, for example, the top and bottom surfaces for receiving items such as "D" rings and/or wire clips (see FIGS. 2-4, 6 and 7). Alternatively (or additionally), one or more apertures can be defined through the sidewalls (not shown). Connector portion 28 can function as an arm between suction portion 12 and receptacle portion 14 and may be made to connect the two at various angles and lengths as well as be formed in various configurations and shapes and the like known to one having ordinary skill in the art. For example, an arm of greater length than others may be more suitable for clearing certain interfering copings that can exists on, for instance, swimming pools.

Referring, for example, to FIGS. 1 and 3-5, receptacle portion 14 of holder 10 can include receiving channel 30 defined therein in accordance with at least one exemplary embodiment. As shown, receptacle portion 14, itself, may be tube-like in form corresponding to receiving channel 30 defined therein. In at least one exemplary embodiment, receptacle portion 14 and receiving channel 30 can be made or formed to receive and hold pole-type portions of various items where receiving channel 30 can be made to any suitable diameter for receiving such corresponding pole-type portions such as pole-type portions having diameters between 0.75 and 1.75 inches (e.g., about 1.25 inches).

Although not shown, in other embodiments, receptacle portions can include various receiving mechanisms beyond a channel or a channel sealed at one end (also not shown) including various conventional clamp-like mechanism, pressure holding mechanism, pin and hole mechanisms, ratchet mechanisms, elastomeric holders for fittingly engaging work pieces without necessarily a need for moving parts, key mechanism and all others known to one having ordinary skill in the art. Additionally, also not shown, receptacle portions can be configured for holding and/or supporting various forms (that are not pole-type in form) known to one having ordinary skill in the art such as substantially rectangular beam-like portions.

Referring to FIGS. 1-3 and 5-8, receptacle tubular portion 14 can have a defined slit, groove or opening (not shown) traversing any portion thereof (including running lengthwise or along the diameter) where such slit or opening provides some flexibility in receiving pole-type portions of items, particularly, items having differing diameters. For example, a slit may be defined on the top portion of receptacle portion 14 running along the diameter. Hold actuator 32 can project from receptacle portion 14 and may project from the top portion thereof where hold actuator 32 approaches a distal end of receptacle tubular portion 14. Hold actuator 32 can be tab-like in form. Hold actuator can also have a groove, opening or split (not shown). In at least one embodiment, hold actuator 32 can have a split (i.e. slit) defined vertically there-through that can separate hold actuator 32 into two separate tabs interfaced with, for example, the top portion of receptacle portion 14. The split of actuator 32 and the slit of receptacle portion 14 may optionally meet at a "T"-like junction.

Still referring to FIGS. 1-4 and 5-8, hold actuator 32 can be associated with hold-actuating lever 40 where hold-actuating lever 40 and hold actuator 32 can have pin channel 36 (see, e.g., FIG. 8) defined through both for receiving pin 38 there-through and providing a coupling mechanisms for hold actuator 32 and hold-actuating lever 40. Thus, pin channel 36 can be defined by apertures that are themselves defined in hold-actuating lever 40 and hold actuator 32 and when lever 40 and actuator 32 are suitably associated and the apertures thereof align form pin channel 36. Pin 38 can be any of the various types of pins known to one having ordinary skill in the art such as a threaded bolt and locking nut, which further can be made of stainless steel as one non-limiting example. Washers may be used in embodiments, particularly, embodiments employing a threaded bolt and locking nut. For example, a washer may be interspersed between any spaces in and around the locking nut and the portions of the threaded bolt engaged therewith. Also, the opposite end of the bolt may have a washer located so as to abut against the portions of the head of the bolt and portions of hold-actuating lever 40.

Figure 6:
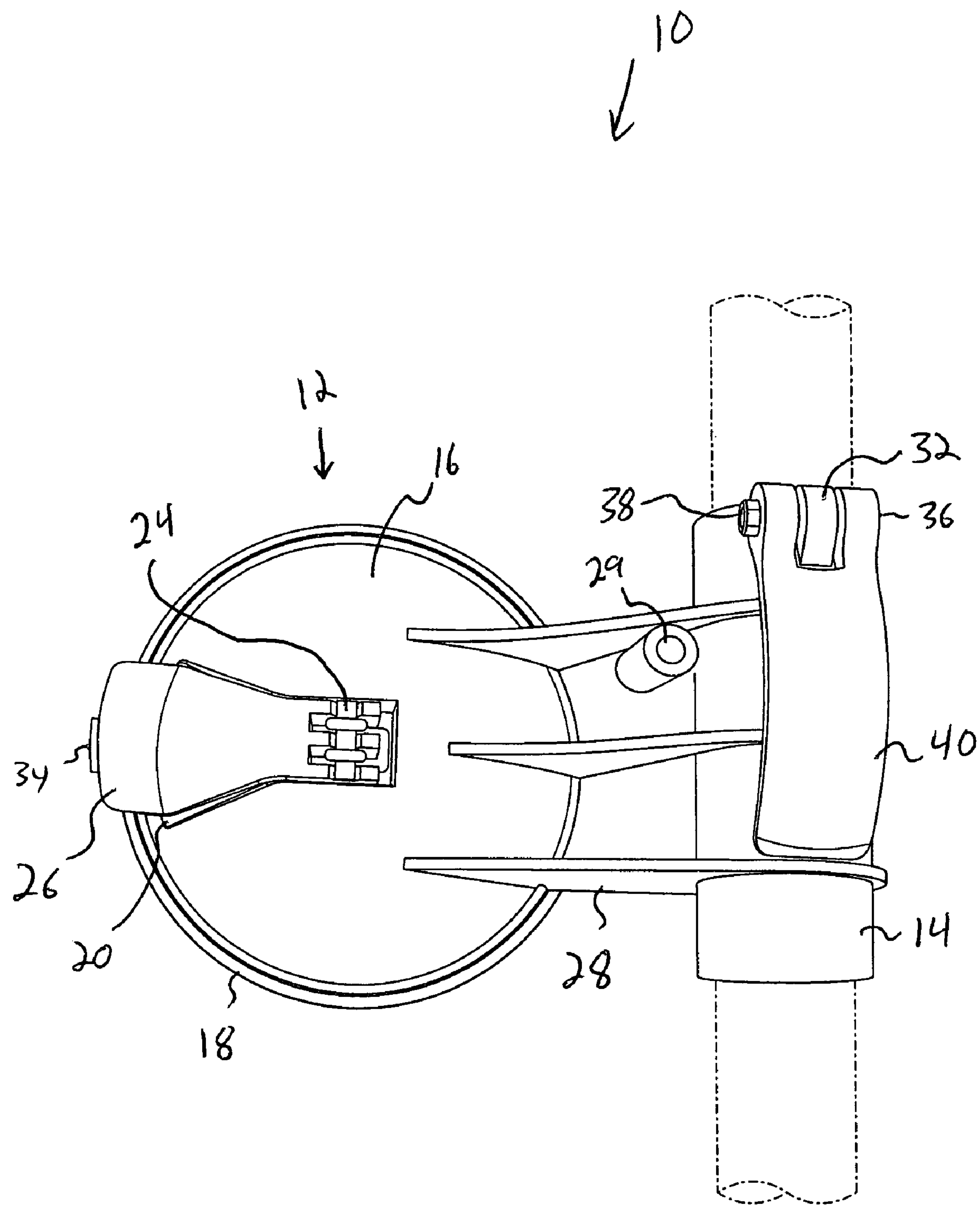
FIG. 6 is a top view showing an exemplary suction-actuating lever configured to provide attachment (e.g., depressed lever) for one exemplary embodiment, which also is acting to hold a pole-type work piece.

Referring, for example, to FIG. 6, where suction-actuating lever 26, is in the suction-engaged (e.g., depressed) state. If suction interface 18 of holder 10 is placed against a surface such as a smooth or semi-smooth surface where suction-actuating lever 26 is in suction-disengaged state (e.g., elevated), then suction can be engaged by, for example, depressing suction-actuating lever 26. In at least one exemplary embodiment, depressing suction-actuating lever 26 can impart a lifting force to suction actuator 24, which, in turn, can pull on suction interface 18 creating a vacuum force between suction interface 18 and the surface it is acting on. This can provide suction and thus can allow suction portion of holder 12 to substantially attach to a surface. De-attaching may only require returning suction-actuating lever 26 to a suction-disengaged state, which can result in destroying the vacuum force between suction interface 18 and the surface.

Figure 7:
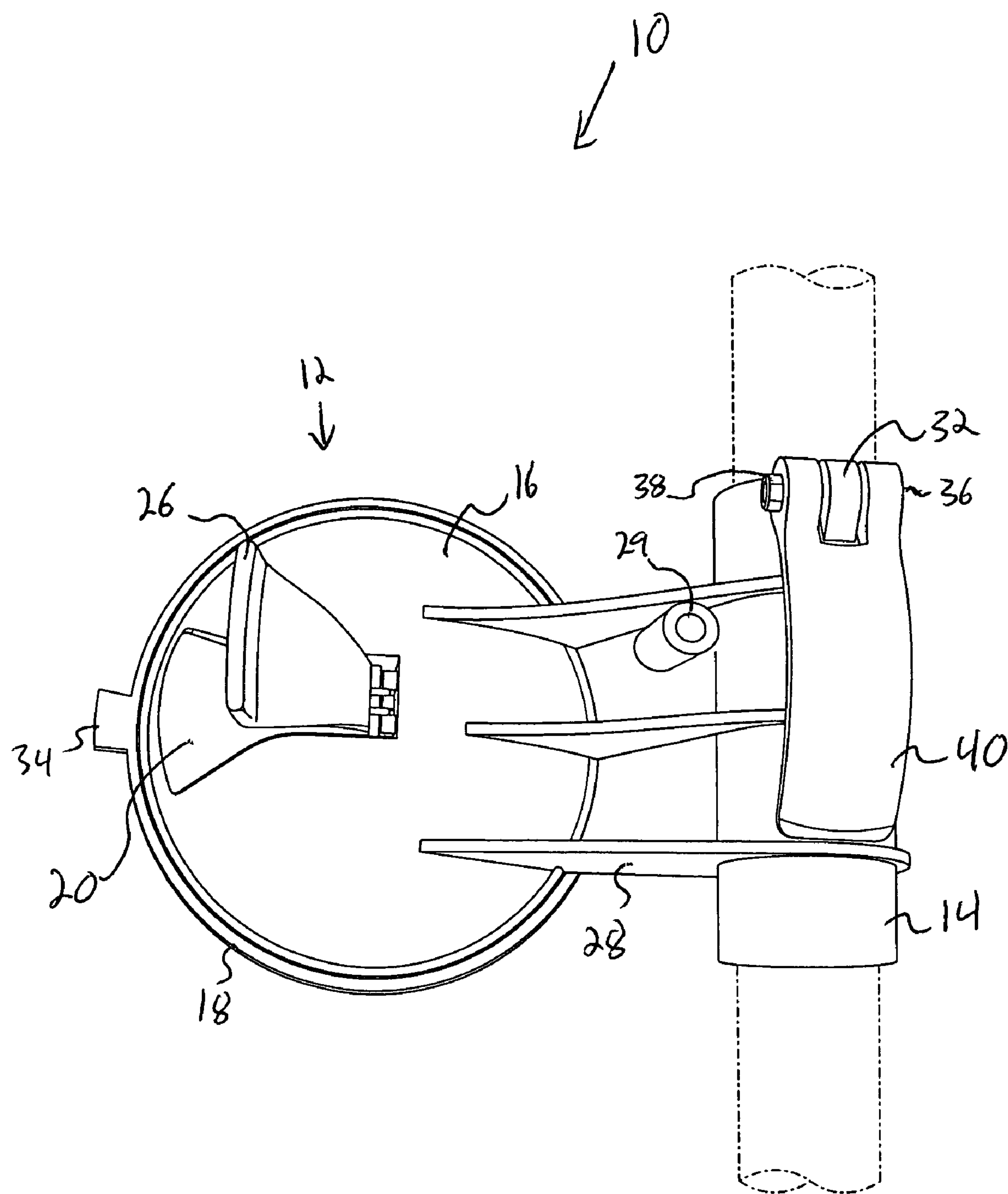
FIG. 7 is another top view showing an exemplary suction-actuating lever configured to provide detachment (e.g., elevated lever) for one exemplary embodiment, which is also acting to hold a pole-type work piece.
Figure 8:
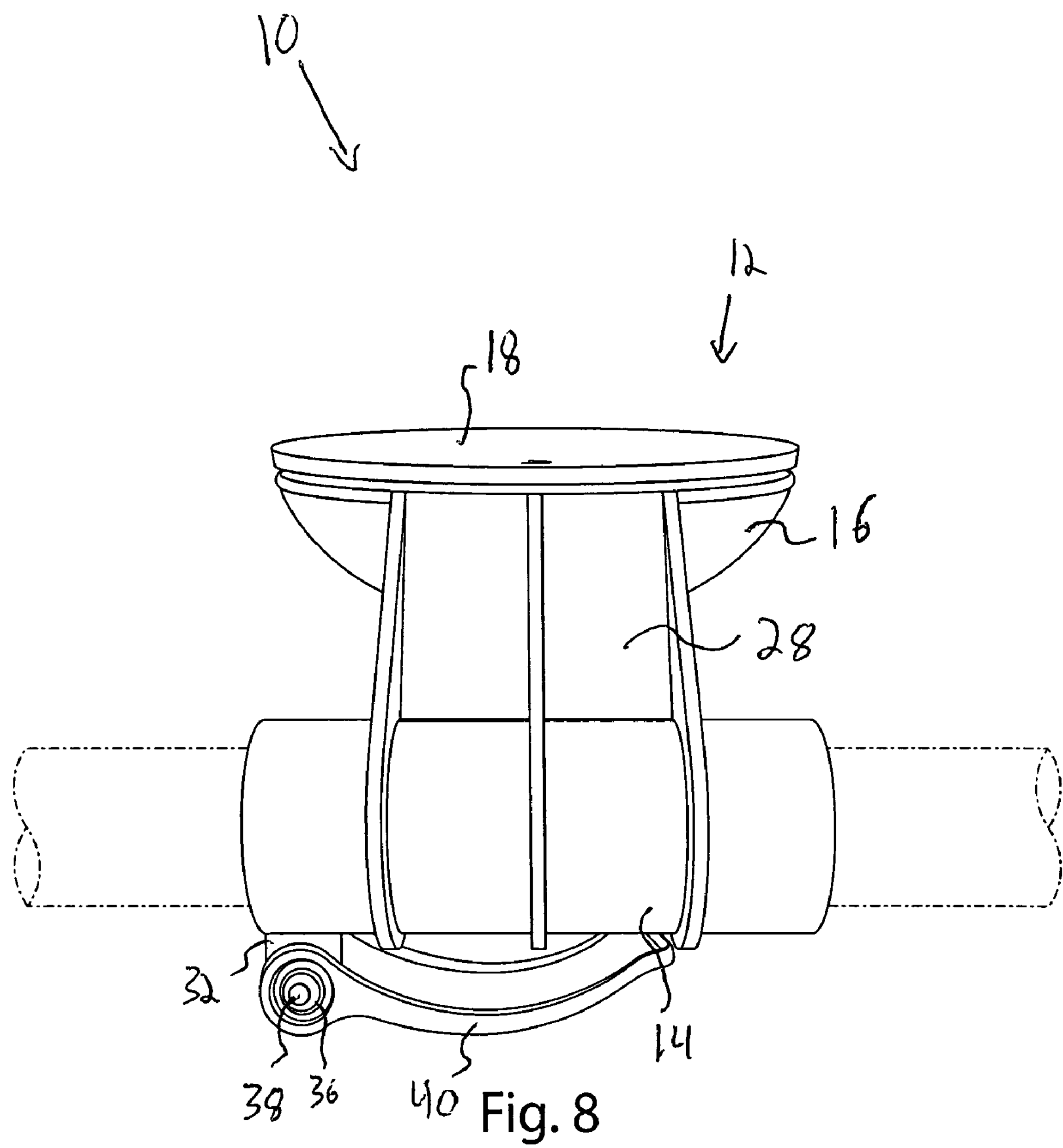
FIG. 8 is a back view of an exemplary embodiment that is inverted and acting on a pole-type work piece.

Referring, for example, to FIGS. 6-8 showing hold-actuating lever 40 in the increased-retaining state (e.g., depressed) so as to act on a pole-type work piece. If a work piece is received within receptacle portion 14 and fitted (even with some degree of looseness) therein where hold-actuating lever 40 is in the decreased-retaining state (e.g., elevated), then further fitting engagement (compression engagement) between receptacle portion 14 and the work piece may be obtained by, for example, depressing hold-actuating lever 40. For example, further fitting engagement between receptacle portion 14 and the work piece can be achieved because when the hold-actuating lever 40 is depressed this can cause a decrease in the effective diameter of receiving channel 30 of receptacle portion 14. As in at least one exemplary embodiment, depressing hold-actuating lever 40 can cause pin 38 to further tighten coupling between hold-actuating lever 40 and hold actuator 32, which, in turn, can cause any slits or splits within the distal end of receptacle portion 14 and hold-actuating lever 40 to approach sealing between (i.e. force together) the opposite ends of each respective slit or split leading to a decrease in the effective diameter of receiving channel 30.

The foregoing description and accompanying drawings illustrate the principles, preferred embodiments and modes of operation of the invention. However, the invention should not be construed as being limited to the particular. embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A suction-based holder, comprising:

a suction portion having a housing and a suction interface, the suction interface having an inner and an outer face, wherein portions of the inner face of the suction interface are associated with the suction housing, the suction portion having a suction actuator coupled to the inner face of the suction interface and a first lever coupled to the suction actuator for reversibly actuating suction on surfaces, the suction housing having a basin-like indentation, the basin-like indentation further having a recess defined in the floor thereof, wherein the basin-like indentation allows at least a partial range of motion for first lever and the recess provides an opening for the suction actuator;

a receptacle portion having a receiving channel defined therein; and a connector portion connecting the suction portion and the receptacle portion.

2. The holder of claim 1 wherein the suction portion, the receptacle portion and the connector portion are integral.

3. The holder of claim 1 wherein the suction portion has lever actuated suction.

4. The holder of claim 1 wherein the suction housing is substantially cup-like and the suction interface is substantially circular.

5. The holder of claim 1 wherein the receptacle portion is substantially tubular as is the receiving channel defined therein.

6. The holder of claim 5 wherein the receptacle portion has a slot defined within a portion thereof.

7. The holder of claim 5 wherein the receiving channel is open at both ends.

8. The holder of claim 1 wherein the receptacle portion has a hold actuator.

9. The holder of claim 8 wherein the receptacle portion has a hold actuator as an appendage from the top portion of the receptacle portion, the hold actuator being substantially tab-like.

10. The holder of claim 8 wherein the hold actuator is coupled with a second lever.

11. The holder of claim 10 wherein the hold actuator is coupled with a second lever via a pin.

12. The holder of claim 1 wherein the connector portion is a bridging member between the suction portion and the receptacle portion.

13. The holder of claim 1 wherein the connector portion has at least one aperture defined through the connector portion.

* * * * *